Nov. 23, 1937. N. J. SMITH ET AL 2,100,110
AIR CONDITIONING
Filed June 30, 1933 2 Sheets-Sheet 1

Nelson J. Smith
Jewel C. Chambers
INVENTORS

BY
ATTORNEYS

Patented Nov. 23, 1937

2,100,110

UNITED STATES PATENT OFFICE 2,100,110

AIR CONDITIONING

Nelson J. Smith and Jewel C. Chambers, Dayton, Ohio, assignors, by mesne assignments, to General Motors Corporation, a corporation of Delaware Application June 30, 1933, Serial No. 678,388

18 Claims. (Cl. 257—3)

This invention relates to refrigeration, and more particularly to apparatus used for conditioning air in an enclosure for the comfort of occupants of said enclosure.

An object of the invention is to provide an apparatus whereby proper air conditions are maintained within an enclosure notwithstanding that all operations of heating, cooling, humidification and dehumidification may be necessary.

Further objects and advantages of the present invention will be apparent from the following description, reference being had to the accompanying drawings, wherein a preferred form of the present invention is clearly shown.

Figure 1:
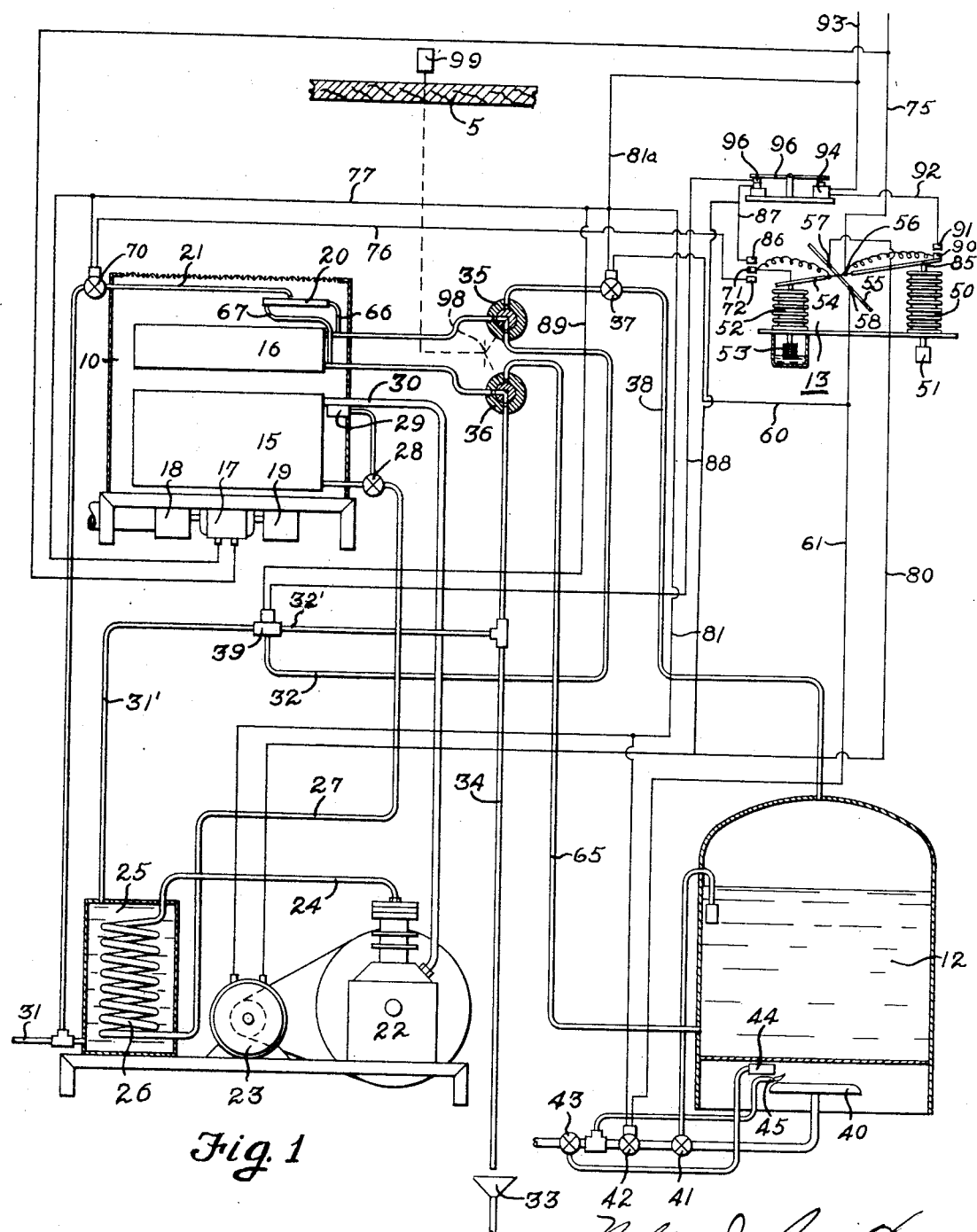
Fig. 1 is a diagrammatic representation of an apparatus embodying features of the invention.
Figure 2:
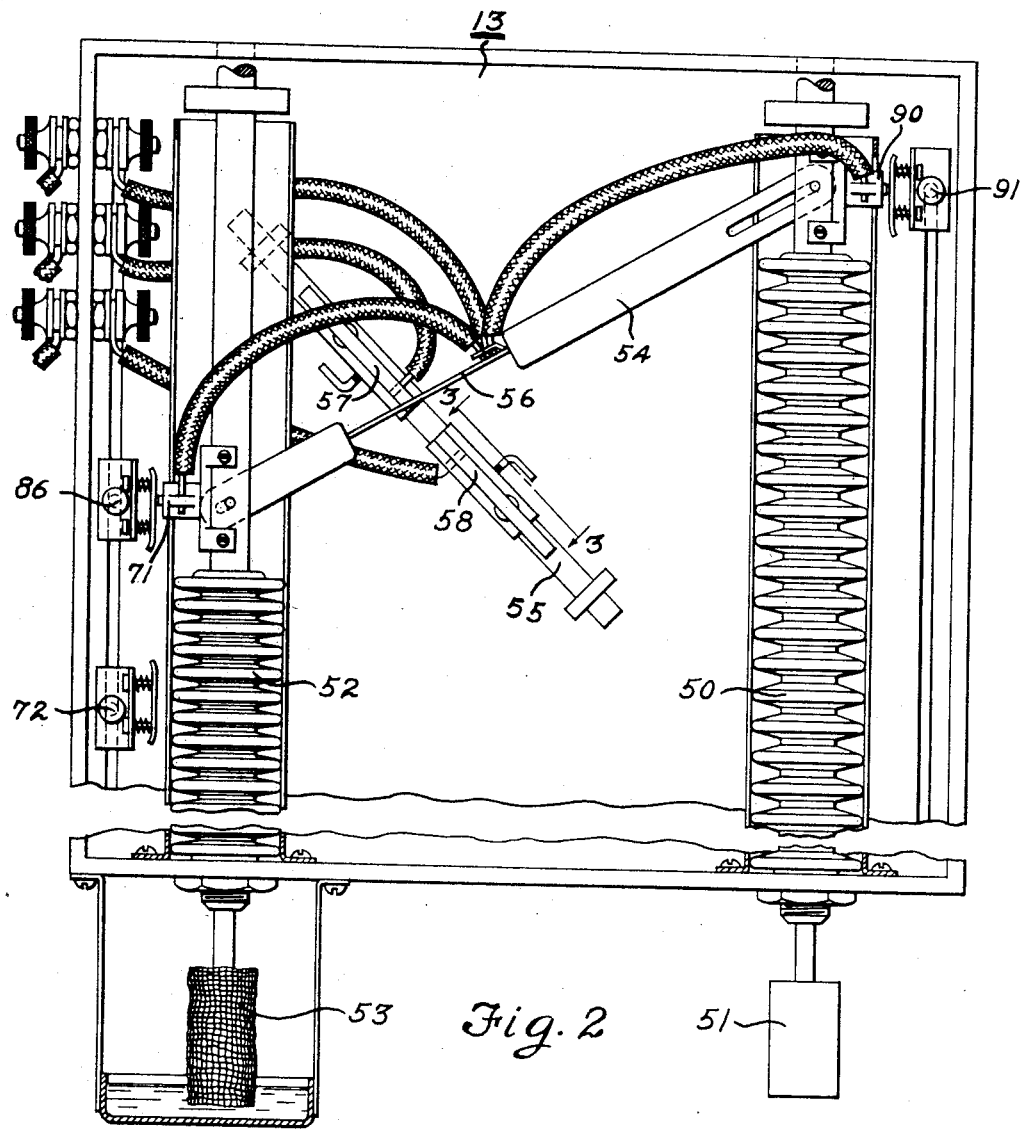
Fig. 2 is a view of an automatic control which may be used.
Figure 3:
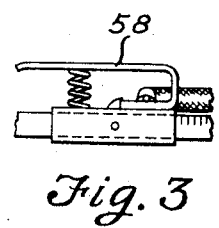
Fig. 3 is a view taken along the line 3—3 of Fig. 2.

During the winter time it is necessary for an apparatus to provide for an even temperature within the space to be conditioned, and such apparatus should also maintain the relative humidity of the area within comfort limits in order to obtain a desirable comfort condition. Similarly, in the summer, there are conditions and times when it is not only necessary to cool the conditioned space but also to dry the air to a substantial degree, without appreciable cooling, in order to obtain similar living conditions. The apparatus hereafter described is adapted to perform the above functions so as to provide relatively comfortable living conditions throughout the year.

In accordance with this invention the air conditioning apparatus includes, in general, an enclosure having an enclosing wall 5, the air of which enclosure is to be conditioned. The enclosure is provided with a cooling device 15, with a heating device or tempering means 16, and with the necessary apparatus to provide heating and cooling power to these devices as conditions require.

Preferably means, in the form of motor 17 and blowers 18 and 19 and casing 10, are provided to create a stream of air for said enclosure, and to condition said stream by causing it to contact with said cooling and heating devices 15 and 16.

The air cooling device 15 may be refrigerated by a refrigerating system hereafter to be more fully described. Preferably, though not necessarily, the air cooling device is in the form of a coil or pipe, the outer surface of which forms the air cooling means, and the inner walls of which form an evaporating chamber for the refrigerating system. The heating device or tempering means 16 preferably, though not necessarily, is also in the form of a coil or pipe, the outer surface of which forms the air heating means, and the inner walls of which form a passageway for the water or other heating or tempering fluid supplied from the refrigerating system or boiler hereafter to be more fully described.

Air humidifying means are also provided in the form of a water evaporating plate 20.

While specific forms of heating and cooling means 15 and 16, and of humidifying means 20 have been shown and described, it is to be understood that other forms may be used in their stead.

Automatic controls are provided, as hereinafter to be more fully described, to control the operation of the cooling and heating devices 15 and 16 and of the air humidifying means 20 in accordance with air conditions in the enclosure. The automatic controls include a mechanism, generally designated as 13, which we term an "etostat", and a thermostat 99. The "etostat" 13 is more fully described in the patent application of Francis R. Bichowsky, Serial No. 640,228, filed October 29, 1932, to which reference is made, if necessary, for a further description thereof. Briefly, it is a mechanism which is responsive to wet bulb and dry bulb temperature conditions in such a manner that the intersection of the lever 54 and rod 55 is representative, on a vertical scale, of the "effective temperature" or the temperature which the average person "feels" under normal conditions of clothing, air velocity, etc.

The refrigerating system for circulating liquid refrigerant through the cooling coil 15 and withdrawing evaporated gaseous refrigerant therefrom consists of the usual compressor element 22 which is driven by a motor 23 in any suitable manner. The compressor delivers compressed refrigerant gas through the refrigerant line 24 to the water cooled condensing unit 25 wherein gaseous refrigerant is liquefied in the condensing coils 26 and is delivered through the liquid refrigerant line 27 to the cooling coil 15. The control of admission of liquid refrigerant into the cooling coil 15 may be by any suitable expansion valve 28. This valve may be either of the automatic constant pressure type or may be of the thermostatic type wherein a thermostatic bulb 29 is located on the suction line of the cooling coil 15 to prevent liquid refrigerant from spilling into the suction line 30 and in which the valve admits only sufficient refrigerant to refrigerate the coils 15. The condenser 25 is of the water cooled variety wherein the water enters through the pipe 31 and then passes through the condenser and picks up a considerable quantity of heat in liquefying the refrigerant. The hot water is discharged through the line 31' and may be disposed of by two methods. In one of these methods, where no heat is to be added to the room the hot water from the condenser 25 flows through the line 32' and thence through a drain line 34 to the drain 33. The second method of disposing of the condenser water, where heat is to be added to the room, will be explained hereinafter.

The boiler 12 is for the purpose of generating steam or hot water to heat the coil 16 during the winter months. The amount of water in the boiler system determines whether steam or hot water is supplied from boiler 12, as is readily understood. The heating coil 16 is connected to the boiler 12 and also to the hot water discharge from the condenser 25 by means of two three-way valves 35 and 36 respectively. Valve 35 is located in the inlet line to the heating coil and valve 36 is located in the discharge line from same. These valves preferably are adapted to be manually controlled, but may be automatically controlled as hereinafter more fully to be described, and are interconnected at 98 in such a manner that they will both be turned at the same time so that the heating coil 16 is connected either to the boiler 12 or the condenser 25 but preferably not to both. A solenoid valve 37 is placed in the steam or hot water line 38 from the boiler 12 to control the flow of steam or hot water. A similar solenoid valve 39 is placed in the condenser discharge line 31' to control the direction of flow of the heated condenser water either to the discharge line 34 or the line 32 which connects with the heating coil 16. The gas burner 40 of the boiler 12 is controlled by means of a thermostatically operated valve 41 which operates in response to the temperature within the boiler. The gas line to the gas burner 40 is opened and closed in response to a solenoid valve 42 which is operated in response to an etostat the operation of which will be hereinafter further described. Valve 43, located in the gas line to the burner 40, is a safety control valve operated in response to a thermostat device 44 located in close proximity to the burner 40 so that if the same should go out and also if the pilot 45 should go out, the valve 43 will close to prevent the escape of gas.

The etostat is a device which is adapted to control the operation of the system in such a manner that a comfortable temperature and humidity condition will be maintained within the space to be conditioned at all times. The device consists of a bellows 50 which is actuated in response to a dry bulb 51. A second bellows 52 is provided and is actuated in response to a wet bulb 53. These bellows are interconnected by a lever 54 which moves in response to the action of the respective bellows 50 and 52. A diagonally positioned stationary rod 55 is provided and is adapted to contact the lever 54 in such a manner that the point of crossing represents the "effective temperature" range wherein the apparatus should operate. One lead 75 of the power line for operating the various devices of the apparatus is connected to a contact 56 located on the lever 54. Two contacts 57 and 58 are located on the rod 55, the former of which is located above the lever 54, the latter below the lever, and represent the upper and lower "effective temperature" limits of comfort.

Under normal winter operating conditions, the bulb 51, upon being cooled by low dry bulb temperature conditions within the room, will cause bellows 50 to contract and cause the lever 54 to move downwardly whereby contacts 56 and 58 will close so that an electric circuit will be completed through wire 61 to solenoid valve 42 which controls the gas burner of the boiler. At the same time a circuit is completed through wire 60 to solenoid valve 37 which is located in the steam or hot water line. With these controls operating, steam or hot water will be generated within the boiler 12, sent through the line 38 into the air heating coil 16 where the steam or hot water will condense or cool and return to the boiler through the line 65. It is to be understood that for winter operation the three-way valves 35 and 36 respectively are to be placed in a position whereby the steam or hot water may readily pass therethrough to circulate between the boiler 12 and heating coil 16. During winter operations of the system it is usually necessary to add a considerable quantity of water to the air in order to humidify the same properly. For this purpose the hot plate 20 is provided. This hot plate is adapted to by-pass a small amount of live steam or hot water through the line 66 and return it through line 67 so that as long as steam or hot water is passing through the heating coil 16, the plate 20 will always be hot. Since the plate 20 will always be hot during the winter season it is only necessary to provide a supply of water to drip on the plate 20 which is done through the line 21. The water flow is controlled by means of the solenoid valve 70 which is actuated in response to the wet bulb 53 of the etostat. As the room is supplied with cold air from the outside by infiltration or by positive fresh air supply means, the relative humidity tends to lower to a considerable extent whereby the temperature of the wet bulb 53 is lowered, causing the bellows 52 to contract so as to move contact 71 into contact with contact 72, thus completing an electric circuit to solenoid valve 70 through the electric line 75, line 76 and return circuit through line 77. The completion of the electric circuit opens the solenoid valve 70 to permit water to flow through the pipe line 21 and drip on the hot plate 20 where it is evaporated and absorbed by the circulating air to humidify same.

For summer operation of the system, the three-way valves 35 and 36 are reversed, that is, the positions are changed so that the hot water from the line 32, or other fluid heated by the operation of the refrigerating system, may pass through the heating coil 16 and discharge through the line 34 if the solenoid valve 39 is opened to permit such a circulation. For normal cooling and dehumidifying of the room, both the wet and dry bulbs 53 and 51 respectively have a certain degree of effect over the control. The bellows 50 and 52 which operate in response to the dry and wet bulbs 51 and 53 respectively move so as to actuate the arm 54 so that, when the combined effect of temperature and relative humidity produces too high an "effective temperature" the contact 56 will contact with contact 57, thus completing an electric circuit through the electric line 80 to the motor 23. The return electric line is through line 81, 81a and 93. This circuit therefore starts the refrigerating unit so as to cause the circulation of refrigerant through the cooling coil 15 whereby the circulating air is cooled and dehumidified. For the normal summer operating condition, cooling and dehumidifying is necessary, and the passing of air over the cooling coil 15 is ordinarily sufficient to meet the demand for comfort conditions. There are times, however, when the atmospheric conditions are abnormal, that is, the relative humidity of the air is out of proportion to the ordinary amount normally contained therein. It sometimes happens that the relative humidity increases to an unbearable extent even though the dry bulb temperature is within a range normally called a comfortable temperature. Under such conditions it is very desirable to be able to dehumidify the air without causing any cooling effect. When such a condition is encountered, the movement of the lever 54 by the dry bulb actuated bellows 50 is practically nothing so that the lever 54 could be said to pivot about the point 85 on the bellows 50. As the relative humidity within the room increases, the temperature of the wet bulb will tend to equal that of the dry bulb, thereby causing the bellows 52 to move upwardly in such a manner as to carry a contact 71 into contact with contact 86. When this function is completed, an electric circuit will be completed through electric line 75, 87, 88, 89, 81a and 93, thus carrying current through the solenoid valve 39. The solenoid valve will then operate to connect the conduit line 32 with line 31' and to disconnect partly or wholly line 32' so that the heated discharge water from the condensing element 25 may pass therethrough to the heating coil 16 and be discharged therefrom through a line 34. At the same time that the electric circuit is completed through the solenoid valve 39, there is also a completion of the circuit through the electric motor 23 to the refrigerant liquefying unit 11 to cause same to operate. This throws both the cooling coil 15 and the heating coil 16 of the room cooler 10 into operation at the same time. The total effect of the two coils is to cause only dehumidification of the circulating air. That is, the cooling coil 15 will cool and dehumidify the air circulated therethrough but the heating coil 16 will counteract the cooling effect of the coil 15 so that the air discharged from the room cooler will be at the same temperature at which it entered but will be at a lower relative humidity.

There is still another situation likely to be encountered which is corrected by this system. If the relative humidity of the room rises, the natural tendency for the etostat 13 is to operate so as to cause dehumidification only by causing both the cooling and heating coils 15 and 16 to operate. But there is the possibility that both the relative humidity and the dry bulb temperature may be above that which is normally considered a comfort range. Under such a condition it should be possible to throw the dehumidification reheat circuit out of operation so that the cooling coil 15 continues to operate and the heating coil 16 does not so that both the relative humidity and dry bulb temperature may be reduced by the cooling coil alone. For this purpose, electric contact 90 is connected to the dry bulb actuating bellows 50. When the dry bulb temperature and relative humidity are both too high to be comfortable, the bellows 50 and 52 both expand causing 56 and 57 to close and also contact 90 to close with the contact 91 so that an electric circuit will be completed through the electric line 75, 92, 93, thereby carrying electric current to a solenoid valve 94. When this circuit is completed due to the expansion of the dry bulb actuating bellows 50, the solenoid 94 actuates a lever 95 which carries a contact 96. The movement of the lever 95 and its cooperating contact 96 will cause a break in the electric circuit through electric line 87, 88, 89, thereby closing the solenoid valve 39 to prevent the circulation of hot water through the heating coil.

The motor 23 continues to operate and cool coil 15 notwithstanding this break in the circuit because contacts 56 and 57 are closed and energize the motor 23 through line 75, 80, 81, 81a and 93. Thus both the dry bulb temperature and the relative humidity are reduced by the cooling effect of coil 15 alone.

While the change of operation from summer to winter conditions preferably is accomplished by manually setting valves 35 and 36, it is obvious that the actuating means 98 for these valves may be automatically controlled. For example a snap acting thermostat 99, responsive to outdoor atmospheric temperatures outside of the room wall 5 may actuate the valves 35 and 36 to change the operation of the system from summer to winter conditions, or vice versa, whenever the outdoor atmospheric temperature passes a selected critical temperature, such as 70° F., dry bulb temperature. The thermostat 99 may be responsive only to dry bulb temperatures, but preferably it may be made responsive to wet bulb temperature alone, or to a combination of both. As is to be understood, a lower critical temperature is selected than 70° F. if the thermostat 99 is made responsive to wet bulb conditions or to combined dry and wet bulb conditions.

While the form of embodiment of the invention as herein disclosed, constitutes a preferred form, it is to be understood that other forms might be adopted, all coming within the scope of the claims which follow.

What is claimed is as follows:

1. In an air conditioning apparatus, an enclosure, the air of which is to be conditioned, an air cooling refrigerant evaporating chamber for said enclosure, a refrigerant liquefying unit for supplying refrigerant to said evaporating chamber, said refrigerant liquefying unit being cooled by a fluid, tempering means for tempering the air cooled by said evaporating chamber by heat exchange with said fluid, a boiler, means for automatically controlling the operation of said tempering means in accordance with air conditions of said enclosure, and means for connecting said tempering means to said boiler automatically in accordance with atmospheric conditions.

2. In an air conditioning apparatus, an enclosure, the air of which is to be conditioned, an air cooling refrigerant evaporating chamber for said enclosure, a refrigerant liquefying unit for supplying refrigerant to said evaporating chamber, said refrigerant liquefying unit being cooled by a fluid, tempering means for tempering the air cooled by said evaporating chamber by heat exchange with said fluid, a boiler, means for automatically controlling the operation of said tempering means in accordance with air conditions of said enclosure, means for connecting said tempering means to said boiler, and means for humidifying said air.

3. In an air conditioning apparatus, an enclosure, the air of which is to be conditioned, an air cooling refrigerant evaporating chamber for said enclosure, a refrigerant liquefying unit for supplying refrigerant to said evaporating chamber, said refrigerant liquefying unit being cooled by a fluid, tempering means for tempering the air cooled by said evaporating chamber by heat exchange with said fluid, a boiler, means for automatically controlling the operation of said tempering means in accordance with air conditions of said enclosure, means for connecting said tempering means to said boiler, means for automatically controlling the heating operation of said tempering means when connected to said boiler in accordance with air conditions of said enclosure, and means for automatically humidifying said air in accordance with air conditions of said enclosure.

4. In an air conditioning apparatus, an enclosure, the air of which is to be conditioned, an air conditioning device including air heating and cooling fluid chambers for said enclosure, a refrigerating system for supplying refrigeration to said air cooling fluid chamber of said air conditioning device for said enclosure, said system including a refrigerant liquefying unit cooled by a fluid, said air heating fluid chamber tempering the air cooled in said air conditioning device by heat exchange with said fluid, a boiler, and means for connecting said air heating fluid chamber to said boiler automatically for winter conditions in response to outside temperatures.

5. In an air conditioning apparatus, an enclosure the air of which is to be conditioned, an air conditioning device for said enclosure including air heating and cooling fluid chambers, a refrigerating system for supplying refrigeration to said air cooling fluid chamber, said system including a refrigerant liquefying unit cooled by a fluid, said air heating fluid chamber tempering the air cooled in said air conditioning device by heat exchange with said fluid, a boiler, and means for automatically causing said boiler to heat said air for winter conditions in response to outside temperatures.

6. In an air conditioning apparatus, an enclosure the air of which is to be conditioned, a conduit, means circulating a stream of air through said conduit for said enclosure, cooling means in said conduit, heating means in said conduit, a refrigerant liquefying unit connected to said apparatus to absorb heat from said stream through said cooling means and to impart heat to said stream through said heating means, a boiler, means for automatically stopping said refrigerant liquefying unit and starting said boiler for winter conditions in response to outside temperatures, and means for transferring heat from said boiler to said air stream in said conduit.

7. In an air conditioning apparatus for an enclosure, means creating a stream of air for said enclosure, a heat transfer system including heat absorbing means thermally connected to said air stream, and heat dissipating means thermally connected to said air stream, means automatically controlling the operation of said heat transfer system in accordance with air conditions in said enclosure, means for automatically causing said heat transfer system to dissipate heat into said air stream when the wet bulb temperature in said enclosure rises above a predetermined point, and means for neutralizing said last named means when the dry bulb temperature in said enclosure rises above a predetermined point.

8. In an air conditioning apparatus, for an enclosure, means creating a stream of air for said enclosure, a heat transfer system including heat absorbing means thermally connected to said air stream, and heat dissipating means for dissipating heat absorbed in said absorbing means and thermally connected to said air stream, means automatically controlling the operation of said heat transfer system in accordance with combined dry and wet bulb effective temperatures in said enclosure, and means for automatically causing said heat transfer system to dissipate heat into said air stream when the wet bulb temperature increases beyond a desired degree.

9. In air conditioning apparatus for an enclosure, means creating a stream of air for said enclosure, a heat transfer system including heat absorbing means thermally connected to said air stream, and heat dissipating means for dissipating heat absorbed in said absorbing means and thermally connected to said air stream, means automatically controlling the operation of said heat transfer system in accordance with the effective temperature in said enclosure, and means for automatically causing said heat transfer system to dissipate heat into said air stream when the wet bulb temperature increases beyond a desired degree.

10. In an air conditioning apparatus for an enclosure, heat removing means for removing heat from air for said enclosure, heat adding means for adding heat to air for said enclosure including heat already removed by said heat removing means, dry bulb responsive means, wet bulb responsive means, means automatically controlling said heat removing means by both of said responsive means, and automatic means controlling said heat adding means by one of said responsive means.

11. In an air conditioning apparatus for an enclosure, heat removing means for removing heat from air for said enclosure, heat adding means for adding heat to air for said enclosure including heat already removed by said heat removing means, dry bulb responsive means, wet bulb responsive means, means automatically controlling said heat removing means by both of said responsive means, and automatic means controlling said heat adding means by said wet bulb responsive means.

12. In an air conditioning apparatus for an enclosure, heat removing means for removing heat from air for said enclosure, heat adding means for adding heat to air for said enclosure, dry bulb responsive means, wet bulb responsive means, means automatically controlling said heat removing means by both of said responsive means, automatic means controlling said heat adding means by one of said responsive means, and means automatically neutralizing said last named automatic means when the other of said responsive means reaches a predetermined limit.

13. In an air conditioning apparatus, an enclosure, means creating a stream of air for said enclosure, a heat transfer system including heat absorbing means thermally connected to said air stream, and heat dissipating means for dissipating heat absorbed in said absorbing means and connected thermally to said air stream and connected in flow relationship to heat removing means, means automatically controlling the operation of said heat transfer system in accordance with combined dry and wet bulb effective temperatures in said enclosure, and means for automatically causing said heat transfer system to dissipate heat into said air stream when the wet bulb temperature increases beyond a desired degree.

14. In an air conditioning system for an enclosure, the combination with an air cooler supplied with a refrigerant, an air heater supplied with a heating medium, means to convey air for said enclosure over the cooler and the heater, means whereby heat removed by the refrigerant may be returned to the air through said heater automatically in response to wet bulb conditions in said enclosure, and means responsive to dry bulb conditions in said enclosure stopping the return of heat to the air.

15. In an air conditioning apparatus, an enclosure the air of which is to be conditioned, an air cooling refrigerant evaporating chamber for said enclosure, a refrigerant liquefying unit for supplying refrigerant to said evaporating chamber, means utilizing heat dissipated by said liquefying unit for tempering the air cooled by said evaporating chamber, a separate source of heat, means for automatically controlling the operation of said tempering means in accordance with air conditions, and means for connecting said tempering means to said separate source of heat automatically in accordance with atmospheric conditions.

16. In an air conditioning apparatus, an enclosure the air of which is to be conditioned, an air cooling refrigerant evaporating chamber for said enclosure, a refrigerant liquefying unit for supplying refrigerant to said evaporating chamber, means utilizing heat dissipated by said liquefying unit for tempering the air cooled by said evaporating chamber, a separate source of heat, means for automatically controlling the operation of said tempering means in accordance with air conditions, means for connecting said tempering means to said separate source of heat automatically in accordance with atmospheric conditions, and means for humidifying said air.

17. In an air conditioning apparatus, an enclosure the air of which is to be conditioned, an air conditioning device comprising a refrigerating system provided with an evaporator for cooling air for said enclosure, said system including a refrigerant liquefying unit, means utilizing heat dissipated by said liquefying unit for tempering air cooled by said system, an independent source of heat, and means for automatically supplying heat to said device from said source in response to outside temperatures.

18. In an air conditioning apparatus, an enclosure the air of which is to be conditioned, means for cooling air for said enclosure, a refrigerant liquefying unit connected to said cooling means, means utilizing heat dissipated by said liquefying unit for tempering the cooled air, an auxiliary source of heat for heating air for said enclosure, and means for automatically changing over from cooling to heating in response to outside temperature.

NELSON J. SMITH.
JEWEL C. CHAMBERS.